(12) United States Patent
Bledsoe et al.

(10) Patent No.: US 8,223,384 B1
(45) Date of Patent: Jul. 17, 2012

(54) DEFINING A PRINT IMAGE IN MEMORY FOR HANDHELD IMAGE TRANSLATION DEVICES

(75) Inventors: James D. Bledsoe, Corvallis, OR (US);
Todd A. McClelland, Corvallis, OR (US); Gregory F. Carlson, Corvallis, OR (US); Asher Simmons, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 908 days.

(21) Appl. No.: 12/037,029

(22) Filed: Feb. 25, 2008

Related U.S. Application Data (60) Provisional application No. 60/891,335, filed on Feb. 23, 2007.

(51) Int. Cl.
*G06K 15/00* (2006.01)
*H04N 1/24* (2006.01)
*H04N 1/46* (2006.01)
*B41J 2/015* (2006.01)
*B41J 2/165* (2006.01)

(52) U.S. Cl. ...... 358/1.17; 358/1.16; 358/473; 358/502; 358/515; 347/20; 347/24; 347/29

(58) Field of Classification Search ............ 358/1.17, 358/1.1, 1.12, 2.1, 1.18, 502, 515, 453, 473, 358/496; 347/12, 20, 24, 29, 43, 47, 100, 347/109, 172, 217; D18/14, 54
See application file for complete search history.

(56) References Cited

U.S. PATENT DOCUMENTS

| | | | |
|---|---|---|---|
| 5,278,582 A | 1/1994 | Hongo | |
| 5,387,976 A | 2/1995 | Lesniak | |
| 5,461,680 A * | 10/1995 | Davis | 382/276 |
| 5,578,813 A | 11/1996 | Allen et al. | |
| 5,917,993 A * | 6/1999 | Inuyama et al. | 358/1.9 |
| 5,927,872 A | 7/1999 | Yamada | |
| 5,930,466 A * | 7/1999 | Rademacher | 358/1.15 |
| 5,988,900 A | 11/1999 | Bobry | |
| 6,348,978 B1 * | 2/2002 | Blumer et al. | 358/1.9 |
| 6,384,921 B1 | 5/2002 | Saijo et al. | |
| 6,995,862 B1 * | 2/2006 | Murata et al. | 358/1.9 |
| 7,038,712 B1 | 5/2006 | Livingston et al. | |
| 7,200,560 B2 | 4/2007 | Philbert | |
| 7,297,912 B1 | 11/2007 | Todoroff et al. | |
| 7,410,100 B2 | 8/2008 | Muramatsu | |
| 7,607,749 B2 | 10/2009 | Tabata et al. | |
| 7,929,019 B2 | 4/2011 | Ohmura et al. | |

(Continued)

FOREIGN PATENT DOCUMENTS

| | | |
|---|---|---|
| AU | 2006252324 B1 | 1/2007 |
| EP | 0655706 A1 | 5/1995 |
| EP | 1209574 * | 5/2002 |
| WO | WO03/076196 A1 | 9/2003 |

OTHER PUBLICATIONS

Microsoft ID81498 Microsoft Help and Support Rev 2.5 Feb. 11, 2005 all pages.*

(Continued)

*Primary Examiner* — Benny Q Tieu
*Assistant Examiner* — Ngon Nguyen (57) ABSTRACT

Systems, apparatuses, and methods for defining an image in a handheld imaging translation device are described herein. The image may be defined as a plurality of color planes having a plurality of bits, the bits of each color plane stored in consecutive memory addresses, and the color planes separated by a consistent offset, such that each bit and its associated bits are equally separated by the consistent offset.

21 Claims, 6 Drawing Sheets

U.S. PATENT DOCUMENTS

| | | | |
|---|---|---|---|
| 7,949,370 | B1 | 5/2011 | Bledsoe et al. |
| 7,988,251 | B2 * | 8/2011 | Dimitrijevic et al. ........... 347/12 |
| 2002/0154186 | A1 | 10/2002 | Matsumoto |
| 2002/0158955 | A1 | 10/2002 | Hess et al. |
| 2003/0150917 | A1 | 8/2003 | Tsikos et al. |
| 2004/0021912 | A1 | 2/2004 | Tecu et al. |
| 2004/0208346 | A1 | 10/2004 | Baharav et al. |
| 2005/0001867 | A1 | 1/2005 | Akase |
| 2006/0012660 | A1 | 1/2006 | Dagborn |
| 2006/0061647 | A1 | 3/2006 | Breton |
| 2007/0150194 | A1 | 6/2007 | Chirikov |
| 2008/0007762 | A1 | 1/2008 | Robertson et al. |
| 2008/0144053 | A1 | 6/2008 | Gudan et al. |
| 2008/0212120 | A1 | 9/2008 | Mealy et al. |
| 2009/0034018 | A1 | 2/2009 | Lapstun et al. |
| 2009/0279148 | A1 | 11/2009 | Lapstun et al. |
| 2010/0039669 | A1 | 2/2010 | Chang et al. |
| 2010/0231633 | A1 | 9/2010 | Lapstun et al. |

OTHER PUBLICATIONS

O'Reilly Bitmap Data 1994 O'Reilly &Associate Inc. pp. 1-6.*
Csurgai Programing Windows 1994 Section 6.12 pp. 62-70.*
Fairchild, IEEE 1284 Interface Design Solutions, Jul. 1999, Fairchild Semiconductor, AN-5010, pp. 1-10.*
Texas Instruments, Program and Data Memory Controller, Sep. 2004, Texas Instruments, SPRU577A, all pages.*
U.S. Appl. No. 11/955,209, filed Dec. 12, 2007, Bledsoe et al.
U.S. Appl. No. 11/955,228, filed Dec. 12, 2007, Bledsoe et al.
U.S. Appl. No. 11/955,240, filed Dec. 12, 2007, Bledsoe et al.
U.S. Appl. No. 11/955,258, filed Dec. 12, 2007, Simmons et al.
U.S. Appl. No. 11/959,027, filed Dec. 18, 2007, Simmons et al.
U.S. Appl. No. 11/968,528, filed Jan. 2, 2008, Simmons et al.
U.S. Appl. No. 11/972,462, filed Jan. 10, 2008, Simmons et al.
U.S. Appl. No. 12/013,313, filed Jan. 11, 2008, Bledsoe et al.
U.S. Appl. No. 12/016,833, filed Jan. 18, 2008, Simmons et al.
U.S. Appl. No. 12/036,996, filed Feb. 25, 2008, Bledsoe et al.
U.S. Appl. No. 12/037,043, filed Feb. 25, 2008, Bledsoe et al.
U.S. Appl. No. 12/038,660, filed Feb. 27, 2008, McKinley et al.
U.S. Appl. No. 12/041,496, filed Mar. 8, 2008, Mealy et al.
U.S. Appl. No. 12/041,515, filed Mar. 3, 2008, Mealy et al.
U.S. Appl. No. 12/041,535, filed Mar. 3, 2008, Mealy et al.
U.S. Appl. No. 12/062,472, filed Apr. 3, 2008, McKinley et al.
U.S. Appl. No. 12/188,056, filed Aug. 7, 2008, Mealy et al.

* cited by examiner

DEFINING A PRINT IMAGE IN MEMORY FOR HANDHELD IMAGE TRANSLATION DEVICES

CROSS REFERENCE TO RELATED APPLICATIONS

The present application is a non-provisional application of provisional application 60/891,335, filed on Feb. 23, 2007, and claims priority to said provisional application. The specification of said provisional application is hereby incorporated in its entirety, except for those sections, if any, that are inconsistent with this specification.

TECHNICAL FIELD

Embodiments of the present invention relate to the field of printing, and, in particular, to defining a print image in memory for handheld image translation devices.

BACKGROUND

Traditional printing devices rely on a mechanically operated carriage to transport a print head in a linear direction as other mechanics advance a print medium in an orthogonal direction. As the print head moves over the print medium, an image may be laid down. This systematic, translational movement of the print head allows the image to be defined in memory as horizontal page-width print swaths. Such a memory organization is optimal for a deterministic operational environment where the future location of the print head is known well in advance. Further, such an environment allows for the sequential access of memory, thereby negating the need for recursive and computationally expensive memory address calculations.

While this memory allocation scheme may work well with traditional printers, the non-deterministic or random motion of handheld image translation devices discourages a sequential and interleaved image definition in memory. For example, such an image definition utilized in a handheld image translation device would require a determination of the absolute position of the image translation device and the specific image characteristics associated with that position to be located and accessed in memory for every print pulse. These memory calculations may impact the printed image. Failure to select and print the image defined in memory prior to a change in location may result in poor image quality or no image at all.

SUMMARY

In view of the challenges in the state of the art, at least some of the embodiments of the present invention are based on the technical problem of defining a print image for an image translation device. More specifically, there is provided, in accordance with various embodiments of the present invention, a method of defining an image in memory including receiving an image from an image source; processing the image to provide a plurality of color planes, each color plane having a plurality of bits, wherein each bit of a color plane is associated with a corresponding bit in each of the other color planes, the associated bits representing a pixel of the image; and storing the plurality of bits in consecutive memory addresses as a dot array.

In some embodiments, the method may include defining the image in memory such that each bit of the plurality of bits for a color plane is separated from its corresponding bits in each of the other color planes by a offset of memory addresses. In various other embodiments, the offset may be a consistent offset.

In some embodiments, the plurality of color planes may include a cyan color plane, a magenta color plane, and a yellow color plane.

In some embodiments, the method may further comprise determining the offset or the consistent offset of memory addresses based on at least one of memory capacity, size of the image, and the number of color planes.

In some embodiments, the method may include each bit of the plurality of bits of a color plane corresponding to that color plane's portion of a pixel of the received image. Alternatively, one or more bits of the plurality of bits of a color plane may correspond to that color plane's portion of a pixel of the received information.

In some embodiments, the method may further include retrieving a bit and its corresponding bits from each of the plurality of color planes utilizing the offset or consistent offset.

In some embodiments, the method may further include retrieving one of the plurality of bits stored in the consecutive memory addresses; and locating the corresponding bits of the retrieved bits by utilizing the offset or the consistent offset in combination with the memory address the retrieved bit.

An apparatus may also be provided in accordance with various embodiments of the present invention. The apparatus may include a communication interface configured to receive an image from an image source; an image processing module configured to process the image to provide a plurality of color planes, each color plane having a plurality of bits, wherein each bit of a color plane is associated with a corresponding bit in each of the other color planes, the associated bits representing a pixel of the image; and a memory controller configured to store the plurality of bits for each color plane as a dot array in consecutive memory addresses of a memory module, the dot array being arranged as the image is to be printed.

In some embodiments, the apparatus may further include a memory module configured to store the image.

In some embodiments, the memory controller may be further configured to store the plurality of bits for each color plane in memory addresses according to a offset. The offset may in various embodiments be a consistent offset and may be determined based on memory capacity, size of the image, and the number of color planes.

In some embodiments, the memory controller may be further configured to retrieve one of the plurality of bits stored in the memory module; and locate the corresponding bits of the retrieved bit from the other color planes by utilizing the offset or consistent offset and the memory address of the retrieved bit.

In various other embodiments, an apparatus may be provided which includes means for receiving an image from an image source; means for processing the image to provide a plurality of color planes, each color plane having a plurality of bits, wherein each bit of a color plane is associated with a corresponding bit in each of the other color planes, the associated bits representing a pixel of the image; and means for storing the plurality of bits for each color plane in consecutive memory addresses as a dot array.

In some embodiments, the apparatus may include means for storing the plurality of bits for each color plane in memory addresses according to a offset. In various embodiments the offset may be a consistent offset.

In some embodiments, the apparatus may include means for determining the offset or consistent offset based on at least one of memory capacity, the size of the image, and the number of planes In some embodiments, the apparatus may further include means for retrieving one of the plurality of bits stored in the consecutive memory addresses; and means for locating the associated bits of the retrieved bit from the consecutive memory addresses by utilizing the offset or consistent offset in combination with the memory address of the retrieved bit.

An article of manufacture is also provided in accordance with various embodiments of the present invention. The article of manufacture may include a computer readable medium; and a plurality of programming instructions stored on the computer readable medium designed to enable a device to receive an image from an image source; process the image to provide a plurality of color planes, each color plane having a plurality of bits, wherein each bit of a color plane is associated with a corresponding bit in each of the other color planes, the associated bits representing a pixel of the image; and store the plurality of bits for each color plane in consecutive memory addresses as a dot array.

In some embodiments, the programming instructions may be further designed to enable the device to store the plurality of bits of a color plane in consecutive memory addresses that are separated from the associated plurality of bits of the other color planes by an offset. The offset in various embodiments may be a consistent offset and may be determined based on memory capacity, size of the image, and the number of color planes.

In some embodiments, the programming instructions may be further designed to enable a device to retrieve a bit and its corresponding bits from each of the plurality of color planes utilizing the offset or the consistent offset.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

The description may use perspective-based descriptions such as up/down, back/front, and top/bottom. Such descriptions are merely used to facilitate the discussion and are not intended to restrict the application of embodiments of the present invention.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

In various embodiments of the present invention, methods, apparatuses, and systems for defining an image in memory are provided. In exemplary embodiments of the present invention, a memory allocation scheme may be utilized where an image is processed to provide separate color planes. Each of the color planes may include data translated or arranged in memory, e.g. a buffer, as a Cartesian (x-y) coordinate space. The color plane data may relate to the entire image or, in various embodiments, may relate to a calculated subset of the image. Furthermore, the color plane data for a subset of image may be determined based upon factors such as the current device position, current device velocity, current angular position of the device, device direction of motion, and physical print head column spacing. As these factors vary, the color plane data may also vary. Consequently, in various embodiments, additional position and velocity calculations or checks may take place to determine if the color plane data is accurate.

Each color plane may be composed of a plurality of bits, with each bit or bits representing that color plane's portion of a pixel. The bits may be stored consecutively in memory according to color planes, with each bit of a color plane associated with a corresponding bit in each of the other color planes to represent a pixel. The corresponding bits in the other color planes may be separated by a offset, which in various embodiments may be a consistent offset. Such a memory allocation scheme may serve to minimize recursive memory address calculations.

Figure 1:
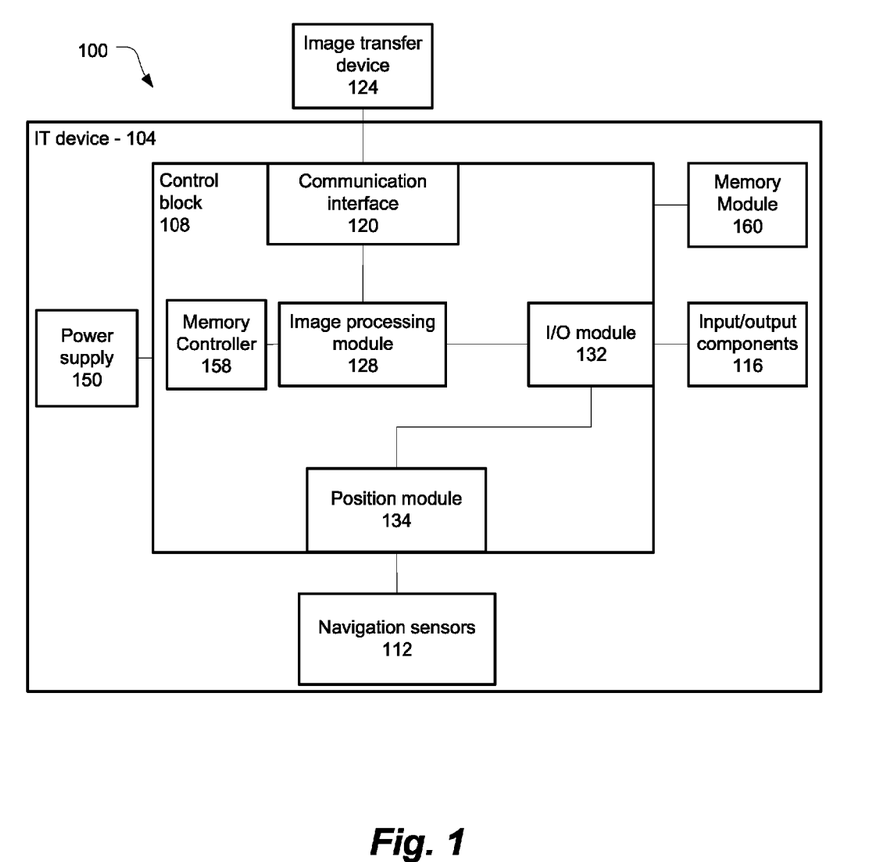
FIG. 1 illustrates a schematic of a system including a handheld image translation device in accordance with various embodiments of the present invention.

FIG. 1 is a schematic of a system 100 including a handheld image translation (IT) device 104 in accordance with various embodiments of the present invention. The IT device 104 may include a control block 108 with components designed to control one or more navigation sensors 112 in a manner to facilitate precise and accurate positioning of one or more input/output components 116 throughout an entire IT operation. This positioning, which may be facilitated through the arrangement of the navigation sensors 112 as will be described in further detail herein, may allow the IT device 104 to reliably translate an image in a truly mobile and versatile platform.

Image translation, as used herein, may refer to a translation of an image that exists in a particular context (e.g., medium) into an image in another context. For example, an IT operation may be a scan operation. In this situation, a target image, e.g., an image that exists on a tangible medium, is scanned by the IT device 104 and an acquired image that corresponds to the target image is created and stored in a memory module 160 of the IT device 104. For another example, an IT operation may be a print operation. In this situation, an acquired image, e.g., an image as it exists in memory module 160 of the IT device 104, may be printed onto a print medium.

The control block 108 may include a communication interface 120 configured to communicatively couple the control block 108 to an image transfer device 124. The image transfer device 124 may include any type of device capable of transmitting/receiving data related to an image involved in an IT operation. The image transfer device 124 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image transfer device 124 is a removable storage device, e.g., a universal serial bus (USB) storage device, the communication interface 120 may be coupled to a port, e.g., USB port, of the IT device 104 designed to receive the storage device.

The communication interface 120 may include a wireless transceiver to allow the communicative coupling with the image transfer device 124 to take place over a wireless link. The image data may be wirelessly transmitted over the link through the modulation of electromagnetic waves with frequencies in the radio, infrared, or microwave spectrums.

A wireless link may contribute to the mobility and versatility of the IT device 104. However, some embodiments may additionally/alternatively include a wired link communicatively coupling the image transfer device 124 to the communication interface 120.

In some embodiments, the communication interface 120 may communicate with the image transfer device 124 through one or more wired and/or wireless networks including, but not limited to, personal area networks, local area networks, wide area networks, metropolitan area networks, etc. The data transmission may be done in a manner compatible with any of a number of standards and/or specifications including, but not limited to , 802.11, 802.16, Bluetooth, Global System for Mobile Communications (GSM), code-division multiple access (CDMA), Ethernet, etc.

In an embodiment where an IT operation includes a print operation, the image transfer device 124 may transfer image data related to an image to be printed to the IT device 104 through the communication interface 120. The communication interface 120 may then transmit the received image data to an on-board image processing module 128. The image processing module 128 may process the received image data in a manner to facilitate an upcoming printing process. Image processing techniques may include dithering, decompression, half-toning, color plane separation, and/or image storage. In various embodiments some or all of these image processing operations may be performed by the image transfer device 124 or another device. The processed image may then be transmitted to an input/output (I/O) module 132, which may function as a print module in this embodiment, where it is cached in anticipation of the printing of the image.

In other embodiments, the processed image may be transmitted to memory controller 158 to store the processed image or a portion of the processed image in memory module 160 according to a predefined memory allocation scheme to facilitate extraction at a later time. Memory module 160 may include random access memory (RAM), dynamic RAM (DRAM), static RAM (SRAM), synchronous DRAM (SDRAM), dual-data rate RAM (DDRRAM), etc, the invention is not to be limited in this regard. Memory module 160 may be coupled to the control block 108 and communicate directly or indirectly with every element therein. Additionally, memory controller 158 may also access memory 160 in preparation for print functions.

The I/O module 132 may also receive positioning information, indicative of a position of a print head of the I/O components 116 relative to a reference location, from a position module 134. The position module 134 may control the navigation sensors 112 to track incremental movement of the IT device 104 relative to a reference location.

Once the I/O module 132 receives the positioning information it may coordinate the location of the print head to a portion of the processed image with a corresponding location. The I/O module 132 may then control the print head in a manner to deposit a printing substance on a print medium adjacent to the IT device 104 to represent the corresponding portion of the processed image.

A print medium, as used herein, may be any type of medium on which a printing substance, e.g., ink, powder, etc., may be deposited. It is not limited to print paper or other thin, flexible print media commonly associated with traditional printing devices.

The print head may be an inkjet print head having a plurality of nozzles designed to emit liquid ink droplets. The nozzles may be arranged in a variety of configurations, the invention is not to be limited in this regard. The ink, which may be contained in reservoirs or cartridges, may be black and/or any of a number of various colors. A common, full-color inkjet print head may have nozzles for cyan, magenta, yellow, and black ink. Other embodiments may utilize other printing techniques, e.g., toner-based printers such as laser or LED printers, solid ink printers, dye-sublimation printers, inkless printers, etc.

In an embodiment in which an IT operation includes a scanning operation, the I/O module 132 may function as an image capture module and may be communicatively coupled to one or more optical imaging sensors of the I/O components 116. Optical imaging sensors, which may include a number of individual sensor elements, may be designed to capture a plurality of surface images of a medium adjacent to the IT device 104. The surface images may be individually referred to as component surface images. The I/O module 132 may generate a composite image by stitching together the component surface images. The I/O module 132 may receive positioning information from the position module 134 to facilitate the arrangement of the component surface images into the composite image.

Relative to the navigation sensors, the optical imaging sensors may have a higher resolution, smaller pixel size, and/or higher light requirements. While the navigation sensors are configured to capture details about the structure of the underlying medium, the optical imaging sensors may be configured to capture an image of the surface of the medium itself.

In an embodiment in which the IT device 104 is capable of scanning full color images, the optical imaging sensors may have sensor elements designed to scan different colors.

A composite image acquired by the IT device 104 may be subsequently transmitted to the image transfer device 124 by, e.g., e-mail, fax, file transfer protocols, etc. The composite image may be additionally/alternatively stored locally by the IT device 104 in memory module 160, as an example, for subsequent review, transmittal, printing, etc. Prior to storage in memory module 160, image processing module 128 may perform various image processing techniques on the received image. Image processing techniques may include dithering, decompression, half-toning, and/or color plane separation, and memory controller 158 may store the processed image or a portion of the processed image in memory module 160 according to various memory allocation schemes.

In addition (or as an alternative) to composite image acquisition, an image capture module may be utilized for calibrating the position module 134. In various embodiments, the component surface images (whether individually, some group, or collectively as the composite image) may be compared to the processed print image rendered by the image processing module 128 to correct for accumulated positioning errors and/or to reorient the position module 134 in the event the position module 134 loses track of its reference point. This may occur, for example, if the IT device 104 is removed from the print medium during an IT operation.

The IT device 104 may include a power supply 150 coupled to the control block 108. The power supply 150 may be a mobile power supply, e.g., a battery, a rechargeable battery, a solar power source, etc. In other embodiments the power supply 150 may additionally/alternatively regulate power provided by another component (e.g., the image transfer device 124, a power cord coupled to an alternating current (AC) outlet, etc.).

Figure 2:
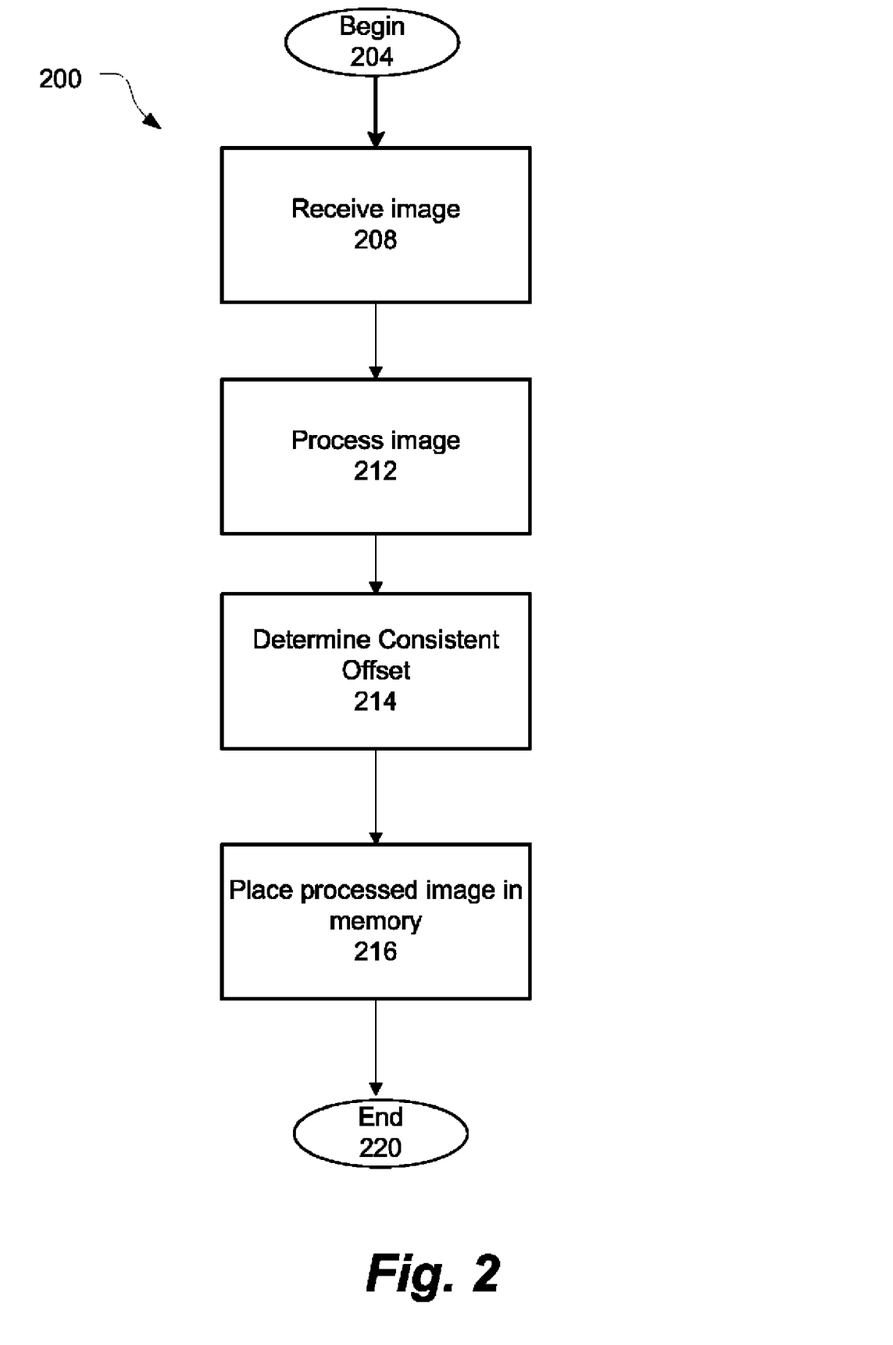
FIG. 2 illustrates a flow diagram depicting an image defining operation in a handheld image translation device in accordance with various embodiments of the present invention.

FIG. 2 is a flow diagram 200 depicting an image defining operation in an IT device, in accordance with various embodiments of the present invention. An image defining operation may begin in block 204 with an initiation of a scanning or printing operation. An image processing module may receive an image in block 208. The image may be received in preparation for a print function, or alternatively, the image may be received subsequent to a scan function. The source of the image may include external devices, external images, digital images, etc. The invention is not to be limited in this regard. The image processing module 128 may receive the image from a communication interface or, in the event that an image previously received needs to be reprocessed, from storage and/or memory.

The image processing module 128 may process the image in block 212. Processing the image, in one embodiment, involves separating the received image into a plurality of color planes having a plurality of bits, i.e., color plane separation. In various other embodiments, processing the image may include separating a calculated portion or subset of the image into a plurality of color planes. The portion of the image to be separated may be determined based upon, for example, the velocity of the device. The received image or portion may be divided into multiple color planes, including but not limited to cyan, magenta, yellow, and/or black, for example. Image processing may include the separation of an image into more or fewer color planes of various colors. Each bit of a color plane may represent that color plane's portion of a pixel of the received image and may be associated with a corresponding bit in each of the other color planes. The associated bits from each of the color planes may cooperatively describe one pixel of the received image. Alternatively, more bits from each color plane may be used to represent that color plane's portion of a pixel of the received image, thereby allowing for a more detailed representation of the pixel.

At block 214 the IT device may determine an offset to be utilized in storing the plurality of color planes as a defined image in memory. In various embodiments, the offset may be a consistent offset. The consistent offset may be determined based on memory capacity, the number of color planes, and/or the size of the image. A consistent offset may be used to minimize calculations necessary to locate and retrieve bits from each of the individual color planes. For example, each bit of the plurality of bits for a color plane may be separated from its corresponding bits in each of the other color planes by the consistent offset. This may allow an IT device to locate one bit using various methods, and subsequently combine the memory address with an offset to locate the various other memory addresses. In various embodiments, the consistent offset may be determined before or after the image has been processed based on various characteristics of the received image. Still further, the consistent offset may be calculated by the image transfer device 124 and transmitted to the IT device along with the received image.

The IT device, at block 216, may place the processed image, e.g., the plurality of color planes in memory, for example a buffer, as a defined image. In various embodiments, the size of the buffer may vary depending upon the size of the received image or image portion. Each of the bits of an individual color plane may be stored in consecutive memory addresses as a dot array, which may be arranged as the image is to be printed, i.e., a plot of the memory space may show a monochrome, magnified version of the image. Additionally, the plurality of bits for a color plane may be separated from their corresponding bits in each of the other color planes by the consistent offset. In various embodiments, to facilitate storage, and utilization of the offset, each of the plurality of color planes may be stored in a memory address beginning at bit zero. Alternatively, however, the plurality of color planes may be stored in consecutive memory addresses which begin at various other bits within a memory address for more efficient usage of the memory capacity. Once the image is defined in memory, the method may end at block 220.

Figure 3:
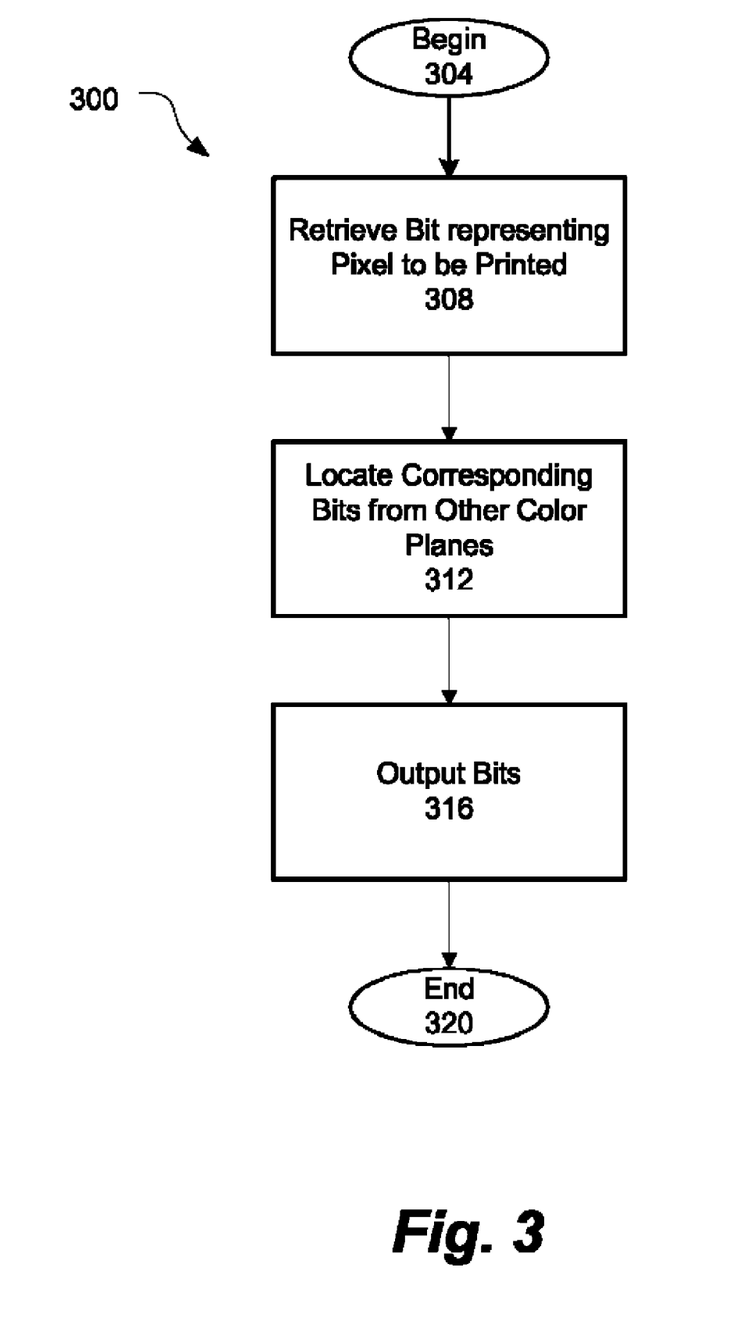
FIG. 3 illustrates a flow diagram depicting the retrieval operation of an image definition in a handheld image translation device in accordance with various embodiments of the present invention.

FIG. 3 illustrates a flow diagram depicting the retrieval operation of an image defined in memory, in accordance with various embodiments of the present invention. The method 300 may begin at block 304 with a request to output a defined image. At block 308, a memory controller may retrieve one of the plurality of bits stored in the memory module. The bit retrieved may correspond to a pixel which is to be output onto the print medium at a desired location. The bit may be accessed by determining the position of the IT device, with reference to the print medium, and by utilizing an algorithm to locate the appropriate memory address out of the consecutive memory addresses for each color plane. The bit to be retrieved may be associated with any of the plurality of color planes and located at any memory address.

Once the bit has been retrieved, the process may continue to block 312 where the IT device may locate the associated bits in each of the other color planes. In various embodiments, locating the associated bits may be done by utilizing the consistent offset and the memory address of the retrieved bit. Utilization of the consistent offset and the memory address of the retrieved bit may involve a plurality of algorithms and functions, including but not limited to, addition, subtraction, and multiplication functions.

At block 316, the IT device may output the associated bits which cooperatively describe the pixel. In some instances, various bits may not be output due to the position of the IT device. For example, the IT device portion which outputs a bit for a particular color plane may be located above an unassociated adjacent pixel. Therefore, in one embodiment, various ones of the associated bits may be dynamically cached for subsequent output based on an estimated direction of the IT device. Alternatively, the previously output bits may be rewritten to indicate their output while the remaining bits in memory are not rewritten and may be subsequently accessed and output. Thus, when data within the image plane buffer cannot be correctly placed during a pass of the print head, due to the angle/position of the print head not aligning properly with the locations of the print medium, it may be placed on a subsequent pass. The method may then end at block 320.

Figure 4:
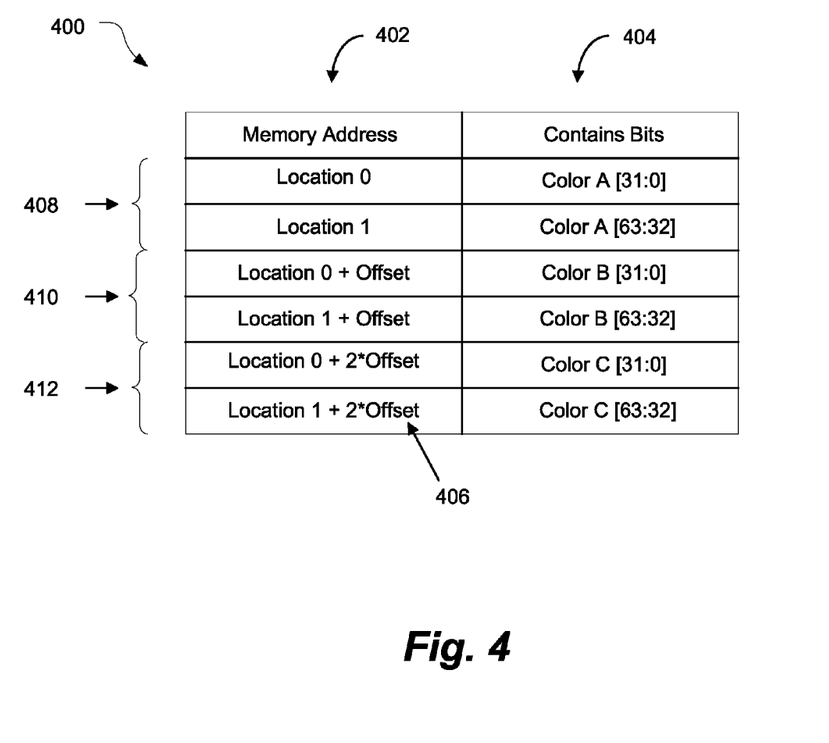
FIG. 4 illustrates a table representation of memory addresses and their associated bits in accordance with various embodiments of the present invention.

FIG. 4, in accordance with various embodiments of the present invention, illustrates a table representation of a memory module 400 having an image defined therein. In various embodiments, the image may be a portion of subset of a larger image. Memory address column 402 illustrates an embodiment of the consecutive memory addresses used for each of the color planes 408, 410, and 412. The memory locations for each of the plurality of color planes may begin at address location 0 and be further defined with reference to a consistent offset, e.g., beginning at location 0, plus an offset 406. Column 404 contains the consecutive bits of each of the plurality of color planes. In the illustrated exemplary embodiment, each color plane includes 64 bits. Color planes may include more or fewer bits.

Memory module 400, in the illustrated embodiment, has a defined image including three color planes, A, B, and C. For each of the bits in color plane A, there are associated bits in color planes B and C. In various embodiments the bits may represent whether ink is to be put down on the print medium. As an example, bit 15 of Color plane A may indicate color A is needed. Associated bits 15 of color planes B, and C, which may also be separated by the consistent offset, may indicate the colors are not needed, and consequently, the pixel may comprise only ink associated with color plane A.

In this embodiment, it may be noted that the consistent offset is 64 bits. However, in other embodiments, the consistent offset may be larger or smaller. The consistent offset may also be utilized in various manners. For instance, the consistent offset may be used in combination with the most recently accessed memory location, causing the consistent offset to remain at 64 bits, or alternatively, always with reference to a base location in which case the consistent offset may be a multiple of 64 bits for each subsequent color plane.

Figure 5:
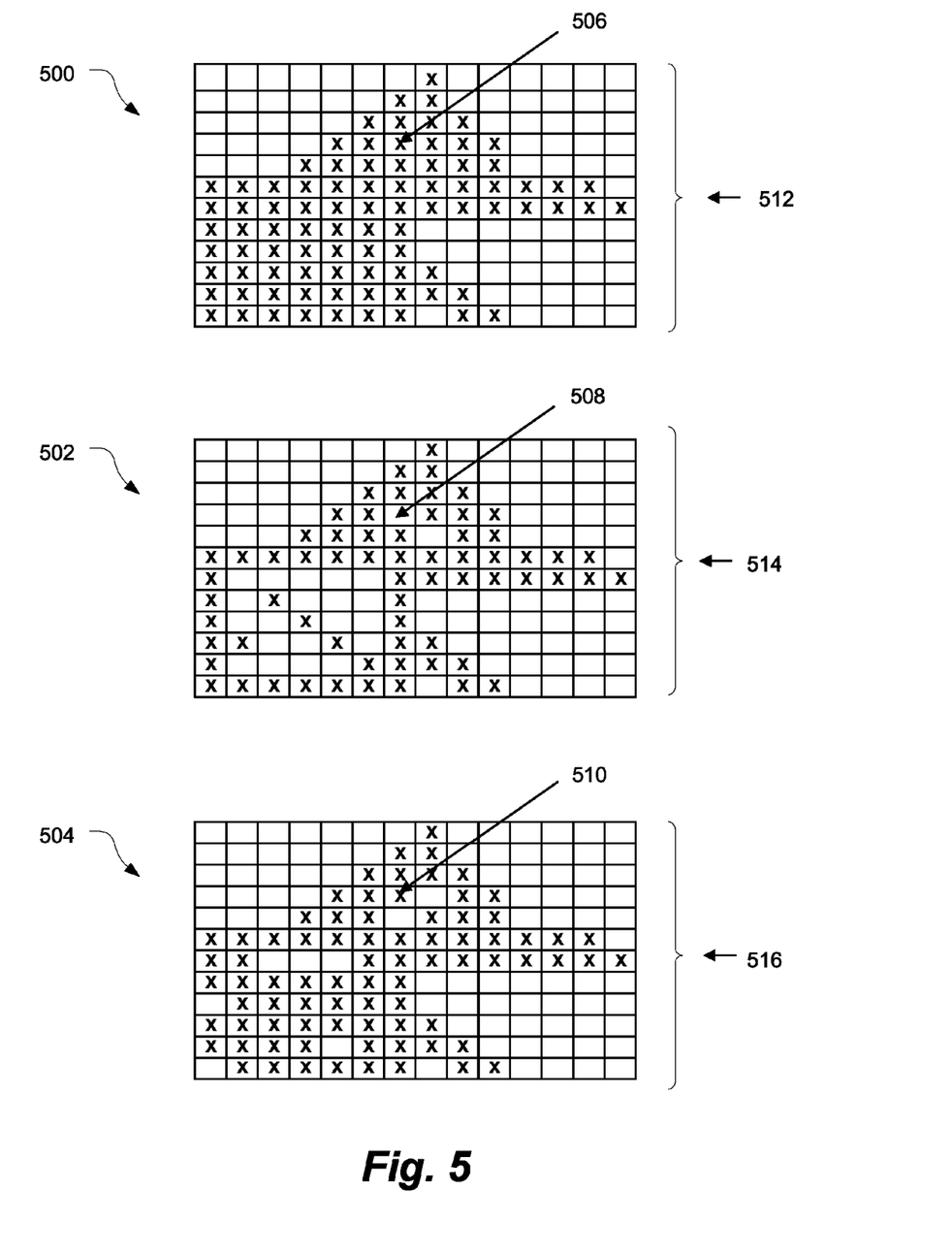
FIG. 5 illustrates a diagram of a plurality of color planes as defined in memory, in accordance with various embodiments of the present invention.

FIG. 5. illustrates a diagram of the plurality of color planes as defined in memory, in accordance with various embodiments of the present invention. In the illustrated embodiment, the memory module includes three color planes 500, 502, and 504. The color planes may include a plurality of bits which are designated as either an "x" or a blank for illustrative purposes. The plurality of bits are stored in consecutive memory addresses 512, 514, and 516, as a dot array arranged as they are to be printed. Consecutive memory addresses 512, 514, and 516 may be separated by a consistent offset. Furthermore, each bit may have an associated bit in each of the other color planes. For example, bit 506 in color plane 500 may have associated bits 508 and 510 in color planes 502 and 504, respectively. All of the associated bits may be located by utilizing the consistent offset and the memory address of any one of the associated bits.

In the illustrated embodiment, bit 506 indicates that color plane 500 contributes ink to the corresponding pixel, bit 508 indicates that color plane 502 does not contribute ink to the corresponding pixel, and bit 510 indicates that color plane 504 contributes ink to the corresponding pixel. Consequently, only bits 506 and 510 from color planes 500 and 504, respectively, are needed to describe the corresponding pixel. Each associated bit of a color plane may be placed on a print medium in accordance with the limitations of the IT device, e.g., the IT device's dots per inch resolution.

Figure 6:
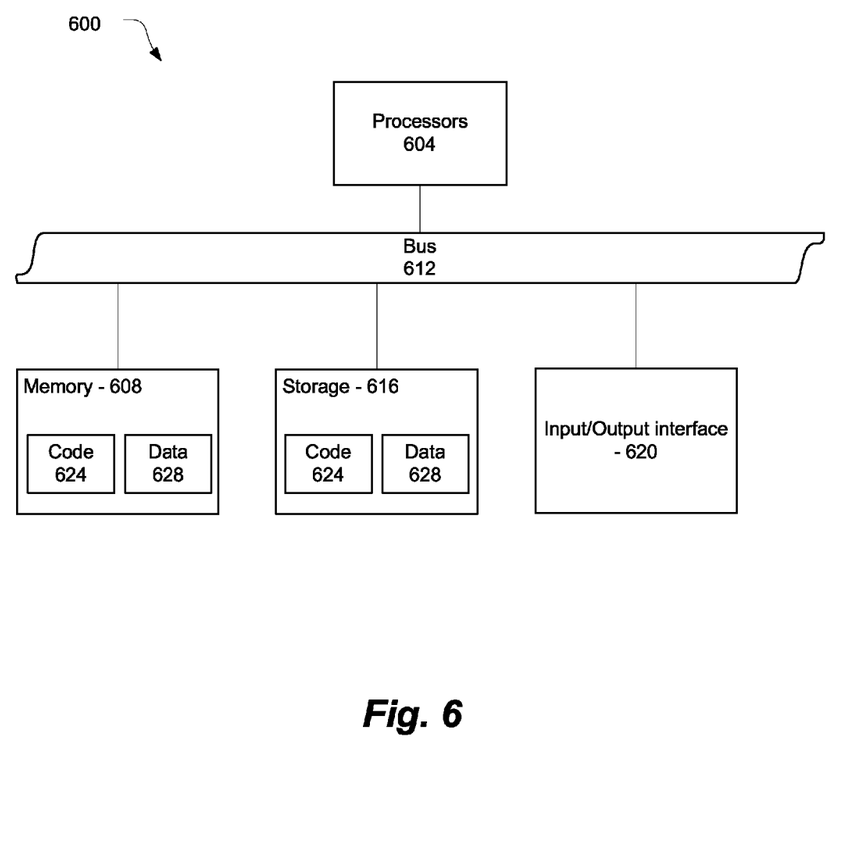
FIG. 6 illustrates a computing device capable of implementing a control block of a handheld image translation device in accordance with various embodiments of the present invention.

FIG. 6 illustrates a computing device 600 capable of implementing a control block, e.g., control block 108, in accordance with various embodiments. As illustrated, for the embodiments, computing device 600 includes one or more processors 604, memory 608, and bus 612, coupled to each other as shown. Additionally, computing device 600 includes storage 616, and one or more input/output interfaces 620 coupled to each other, and the earlier described elements as shown. The components of the computing device 600 may be designed to provide the positioning functions of a control block of an IT device as described herein.

Memory 608 and storage 616 may include, in particular, temporal and persistent copies of code 624 and data 628, respectively. The code 624 may include instructions that when accessed by the processors 604 result in the computing device 600 performing operations as described in conjunction with various modules of the control block in accordance with embodiments of this invention. The processing data 628 may include data to be acted upon by the instructions of the code 624. In particular, the accessing of the code 624 and data 628 by the processors 604 may facilitate image translation and/or positioning operations as described herein.

The processors 604 may include one or more single-core processors, multiple-core processors, controllers, application-specific integrated circuits (ASICs), etc.

The memory 608 may include random access memory (RAM), dynamic RAM (DRAM), static RAM (SRAM), synchronous DRAM (SDRAM), dual-data rate RAM (DDRRAM), etc.

The storage 616 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 616 may be a storage resource physically part of the computing device 600 or it may be accessible by, but not necessarily a part of, the computing device 600. For example, the storage 616 may be accessed by the computing device 600 over a network.

The I/O interfaces 620 may include interfaces designed to communicate with peripheral hardware, e.g., I/O components 116, navigation sensors 112, etc., and/or remote devices, e.g., image transfer device 124.

In various embodiments, computing device 600 may have more or less elements and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method of storing an image in memory, the method comprising:

receiving an image from an image source;

processing, by an image translation device, the image to provide a plurality of color planes, each color plane having a plurality of bits, wherein each bit of a color plane is associated with a corresponding bit in each of the other color planes, the associated bits representing a pixel of the image, and wherein processing the image further comprises separating a portion of the image into the plurality of color planes based at least in part on a velocity of the image translation device; and storing the plurality of bits for each color plane in consecutive memory addresses as a dot array, wherein each particular bit of the plurality of bits for a color plane is separated, by an offset of memory addresses, from the corresponding bits with which the particular bit is associated in each of the other color planes.

2. The method of claim 1, wherein the offset of memory addresses is a consistent offset of memory addresses.

3. The method of claim 1, further comprising determining the offset of memory addresses based on at least one of memory capacity, size of the image, and the number of color planes.

4. The method of claim 1, further comprising, retrieving a bit and the corresponding bits with which the bit is associated in each of the other color planes utilizing the offset.

5. The method of claim 4, wherein the retrieving comprises:

retrieving one of the plurality of bits stored in the consecutive memory addresses; and locating the associated corresponding bits of the retrieved bit by utilizing the offset in combination with the memory address of the retrieved bit.

6. The method of claim 1, wherein the plurality of color planes include a cyan color plane, a magenta color plane, and a yellow color plane.

7. The method of claim 1, wherein one or more bits of the plurality of bits of a color plane correspond to that color plane's portion of a pixel of the image.

8. The method of claim 1, further comprising determining the offset of memory addresses based on a memory capacity.

9. The method of claim 1, further comprising determining the offset of memory addresses based on a size of the image.

10. An image translation apparatus comprising:

a memory module;

a communication interface configured to receive, from an image source, (i) an image and (ii) an offset value;

an image processing module configured to process the image to provide a plurality of color planes, each color plane having a plurality of bits, wherein each bit of a color plane is associated with a corresponding bit in each of the other color planes, the associated bits representing a pixel of the image; and a memory controller configured to (i) store the plurality of bits for each color plane as a dot array in consecutive memory addresses of the memory module, the dot array being arranged as the image is to be printed, and (ii) store each particular bit of the plurality of bits for a color plane such that each particular bit of the plurality of bits for a color plane is separated, by the offset value of memory addresses of the memory module, from the corresponding bits with which the particular bit is associated in each of the other color planes.

11. The image translation apparatus of claim 10, wherein the offset value is a consistent offset value.

12. The image translation apparatus of claim 10, wherein the offset value is determined based on at least one of memory capacity, the size of the image, and the number of color planes.

13. The image translation apparatus of claim 10, wherein the memory controller is further configured to:

retrieve one of the plurality of bits stored in the memory module; and locate the corresponding bits of the retrieved bit from the other color planes by utilizing the offset value in combination with the memory address of the retrieved bit.

14. An apparatus comprising:

means for receiving, from an image source, (i) an image and (ii) an offset value;

means for processing the image to provide a plurality of color planes, each color plane having a plurality of bits, wherein each bit of a color plane is associated with a corresponding bit in each of the other color planes, the associated bits representing a pixel of the image;

means for storing the plurality of bits for each color plane in consecutive memory addresses as a dot array; and means for storing each particular bit of the plurality of bits for a color plane such that each particular bit of the plurality of bits for a color plane is separated, by the offset value of memory addresses, from the corresponding bits with which the particular bit is associated in each of the other color planes.

15. The apparatus of claim 14, wherein the offset value is a consistent offset.

16. The apparatus of claim 14, further comprising means for determining the offset value based on at least one of memory capacity, the size of the image, and the number of color planes.

17. The apparatus of claim 14, further comprising:

means for retrieving one of the plurality of bits stored in the consecutive memory addresses; and means for locating the corresponding bits of the retrieved bit from the consecutive memory addresses by utilizing the offset value in combination with the memory address of the retrieved bit.

18. A tangible computer-readable storage medium having stored therein instructions that when executed by at least one processor are designed to enable a device to:

receive an image from an image source;

process the image to provide a plurality of color planes, each color plane having a plurality of bits, wherein each bit of a color plane is associated with a corresponding bit in each of the other color planes, the associated bits representing a pixel of the image;

store the plurality of bits for each color plane in consecutive memory addresses as a dot array; and store each particular bit of the plurality of bits for a color plane such that each particular bit of the plurality of bits for a color plane is separated, by an offset of memory addresses, from the corresponding bits with which the particular bit is associated in each of the other color planes, wherein the offset is determined based on a memory capacity.

19. The tangible computer-readable storage medium of claim 18, wherein the instructions are designed to enable the device to store the plurality of bits of a color plane in consecutive memory addresses that are separated from the associated plurality of bits of the other color planes by a consistent offset.

20. The tangible computer-readable storage medium of claim 18, wherein the instructions are further designed to enable the device to determine the offset based on at least one of memory capacity, size of the image, and the number of color planes.

21. The tangible computer-readable storage medium of claim 18, wherein the instructions are further designed to enable the device to retrieve a bit and its corresponding bits from each of the plurality of color planes utilizing the offset.

* * * * *